UNITED STATES PATENT OFFICE 2,518,365

WAX SEPARATION BY FILTRATION

Ivan E. Pattillo, Beaumont, Tex., assignor to Socony-Vacuum Oil Company, Incorporated, New York, N. Y., a corporation of New York No Drawing. Application March 10, 1948, Serial No. 14,149

4 Claims. (Cl. 196—19)

This invention relates to a method for separating paraffin wax from mineral oil fractions containing the same and, more particularly, is directed to an improved method of pressing paraffin distillates to provide a more effective separation between the oil and wax components thereof and to yield a paraffin wax of reduced oil content.

In the usual manufacture of paraffin wax, a wax-containing petroleum distillate stock is chilled generally to a temperature equal to or slightly below the pour point desired in the finished oil, and then is filter-pressed for removal of the wax, yielding liquid oil suitable for lubricating oil stock and cakes of solid paraffin. In the art, this solid material resulting from a pressing of chilled paraffin distillate is known as "slack wax." While the removal of liquid by pressure in the filtering operation is carried as far as is feasible, it is, nevertheless, incomplete. The solid slack wax still contains a considerable quantity of oil, often 20 to 40 per cent, due to the occlusion of oil between the wax crystals. The wax cake so obtained must accordingly be subjected to further treatment to remove the residual oil and to obtain waxes of reasonably low oil content and substantially high melting points.

Heretofore, in order to lower the oil content and raise the melting point of initially obtained slack wax, it has been subjected to a sweating or solvent-pressing operation. The former method comprises placing the slack wax in a closed chamber and gradually raising the temperature in said chamber, thereby causing oil contained in the wax cake to sweat or drip therefrom. The oil so obtained, known as "foots oil," is returned to the wax distillate or is resweated. In order to obtain a wax of sufficiently low oil content and high melting point, the sweating operation usually is repeated on the wax obtained from the initial sweating. This practice requires a considerable amount of recycling and hence renders the operation relatively time-consuming. The yields of desired wax, moreover, are generally low because of the rejection of a considerable quantity of wax with the foots oil.

The solvent-pressing method requires dilution of the slack wax with a solvent, usually naphtha, chilling the resulting solution and passing the chilled solution through filter presses. The solvent-pressing methods, while generally yielding larger quantities of wax than the sweating methods, are rather expensive, requiring the use of refrigerating equipment to maintain low pressing temperatures and distillation apparatus to recover solvent from the resulting product. Also, due to the solubility of the wax in the particular solvent employed, a certain proportion of high melting wax of low oil content undesirably passes during the pressing operation into the filtrate.

It has now been discovered, in accordance with the present invention, that a paraffin wax cake of reduced oil content may be obtained by controlling the nature of the charge stock being filter-pressed and the temperature at which said pressing takes place. More specifically, it has been found that a low temperature pressing of a paraffin distillate charge, followed by a high temperature pressing of a slack wax charge through the same filter press, yields an improved wax cake of reduced oil content.

The initial low temperature pressing of a wax-bearing petroleum distillate yields a wax cake still containing a considerable quantity of mineral oil. In accordance with the process of this invention, a secondary slack wax charge, fed through the same presses at a substantially higher temperature, has been found to permeate the porous wax cake obtained as a result of the initial pressing; and, due to higher pressing temperature and the force with which the slack wax charge is pushed through the press, the oil occluded by the initially formed wax crystals is driven out of the wax cake, thereby yielding a resulting paraffin wax of reduced oil content. In order that the secondary pressing operation be conducted at a substantially higher temperature than the initial pressing, it is necessary to employ, as the secondary charge to the presses, a paraffin wax-mineral oil mixture of higher wax content than that of the initial paraffin distillate fed to the presses. A preferred secondary charge for use in the present process is slack wax which may have been obtained from a preliminary dewaxing of a portion of the same or a different paraffin distillate from that employed in the initial charge fed to the presses. Slack wax or other waxy mixture having a wax content higher than that of the initial charge may be obtained by cold pressing operations or by any other of the conventional refinery dewaxing processes, such as solvent treatment of a wax-bearing oil, for example, with a benzol-ketone mixture.

In carrying out the pressing procedure of this invention, it is to be understood that the temperature employed during the initial and secondary pressing operations will, to a large extent, be dependent on the wax content of the respective feeds being supplied to the presses. In order that the process be operated with maximum efficiency, it is, accordingly, necessary to correlate the temperature of pressing with the nature of the charge being fed to the presses. Generally, the initial paraffin distillate fed to the presses will have a wax content varying between about 1 to about 20 per cent wax, and the temperature of pressing such distillates will vary between about 0° F. and about 50° F. The secondary paraffin distillate fed to the presses will necessarily have a wax content higher than that of the initial charge and usually will be between about 20 and about 70 per cent wax. Under such conditions, the temperature of pressing the secondary charge will be between about 50° F. and about 100° F. While the above ranges of temperature and wax content of the charge stocks employed are those which will be usually used, it is to be understood that the present process contemplates generally the steps of initially pressing a wax-bearing petroleum fraction at a low temperature, followed by a secondary pressing of a waxy oil mixture having a higher wax content than that of the initial charge at a higher pressing temperature. The temperature at which the initial pressing is carried out will necessarily be such that at least a portion of the wax present in the feed mixture is in the solid state. Likewise, the temperature at which the secondary pressing is carried out will be below the melting point of the waxy charge but above the temperature at which said charge is completely solidified.

The pressure applied during the initial wax pressing operation gradually increases as the slurry of wax and oil is passed through the press from an initial pressure slightly above atmospheric to a substantially high pressure of about 400 pounds per square inch. Similarly, during the secondary wax pressing operation, the pressure increases as the wax-oil mixture passes through the press. However, in the latter pressing operation, it is generally necessary to employ a greater initial pressure than in the case of the first pressing operation, due to the presence of the initially formed wax cake retained in the filter press. During the secondary pressing operation, the pressure may accordingly vary between about 100 pounds per square inch and about 400 pounds per square inch or greater.

The charging periods for the initial and secondary feed mixtures may vary over wide limits. As a general rule, the initial, comparatively low wax content feed mixture will be supplied to the filter presses for a longer period than the secondary higher wax content feed mixture. Under the usual operating conditions of the process of this invention, the charging period of the initial feed to that of the secondary feed will generally be in a ratio of between about 1 to 1 and about 20 to 1.

It is to be further noted that the wax cake resulting from the initial pressing is retained in the filter presses during the pressing of the secondary charge stock so that the higher wax content charge being supplied to the presses at a higher temperature permeates the slack wax cake initially obtained, forcing oil therefrom and yielding a final homogeneous paraffin wax of reduced oil content.

The following examples will serve to illustrate the process of this invention without limiting the same:

Example 1

East Texas paraffin distillate, having a viscosity of 75 seconds at 100° F. (SUV) and containing 12 per cent by weight of wax, as obtained by the standard A. S. T. M. method, was cooled to 36° F. and charged to a battery of filter presses for a period of 14 hours. This was followed by charging the filter presses for 4 additional hours with slack wax containing about 55 per cent by weight of wax and delivered to the presses at a temperature of about 80° F. The oil content of the resulting wax cake was 12 per cent by weight. Pressing of the same East Texas paraffin distillate alone for a period of 18 hours and at the same pressing temperature of 36° F. resulted in production of a wax cake having an oil content of 27 per cent by weight.

Example 2

Oklahoma City paraffin distillate of 75 seconds at 100° F. (SUV) and 5 per cent by weight of wax was charged for 30 hours to a battery of filter presses at a temperature of 36° F. This operation was followed by pressing slack wax for 5 hours at 80° F. The oil content of the resulting wax cake was 12 per cent by weight. This compares with an oil content of wax cake of 40 per cent by weight when Oklahoma City paraffin distillate was charged independently to the filter presses under similar treating conditions.

I claim:

1. A process for separating paraffin wax from wax-bearing petroleum fractions, comprising the steps of chilling a paraffin distillate to a temperature at which at least a portion of the wax present therein is precipitated, pressing the resulting slurry of wax and oil at said temperature by passing through a filter press to yield a wax cake and an oily filtrate, retaining said initially formed wax cake in said filter press, while charging the press with slack wax maintained at a temperature greater than that of the initial pressing operation, said temperature being below the melting point of the slack wax and above the temperature at which the slack wax is completely solidified to yield, as a result of said initial low temperature paraffin distillate pressing and secondary high temperature slack wax pressing, a homogeneous paraffin wax of reduced oil content.

2. A process for separating paraffin wax from wax-bearing petroleum fractions, comprising the steps of chilling a paraffin distillate to a temperature at which at least a portion of the wax present therein is precipitated, pressing the resulting slurry of wax and oil at said temperature by passing through a filter press to yield a wax cake and an oily filtrate, retaining said initially formed wax cake in said filter press, while forcing a slack wax charge therethrough at a temperature greater than that of the initial pressing so that the slack wax permeates said initially formed wax cake, removing occluded oil therefrom to yield a homogeneous paraffin wax of reduced oil content.

3. A process for separating paraffin wax from wax-bearing petroleum fractions, comprising feeding a chilled slurry of wax and oil through a filter press to yield a wax cake and an oily filtrate, thereafter feeding through the same filter press, while retaining the initially formed wax cake therein, a second slurry of wax and oil having a greater wax content and maintained at a higher temperature than the initial feed charge to yield, as a result of said initial low temperature pressing and secondary high temperature pressing, a homogeneous paraffin wax of reduced oil content.

4. A process for separating paraffin wax from wax-bearing petroleum fractions, comprising feeding a chilled slurry of wax and oil containing between about 1 and about 20 per cent wax through a filter press at a temperature between about 0° F. and about 50° F. to yield a wax cake and an oily filtrate, thereafter feeding through the same filter press, while retaining the initially formed wax cake therein, a second slurry of wax and oil containing between about 20 and about 70 per cent wax and maintained at a temperature between about 50° F. and about 100° F. to yield, as a result of the aforesaid initial and secondary pressing operations, a homogeneous paraffin wax of reduced oil content.

IVAN E. PATTILLO.

REFERENCES CITED

The following references are of record in the file of this patent:

UNITED STATES PATENTS

| Number | Name | Date |
|---|---|---|
| 1,995,740 | Gardner | Mar. 26, 1935 |
| 2,053,872 | Montgomery | Sept. 8, 1936 |
| 2,248,498 | Gross et al. | July 8, 1941 |
| 2,248,668 | Gee | July 8, 1941 |